United States Patent
Carnoy et al.

(10) Patent No.: US 11,673,460 B2
(45) Date of Patent: Jun. 13, 2023

(54) FASTENING OF TRIM TO A WINDOW SEAL

(71) Applicant: AGC GLASS EUROPE, Louvain-la-Neuve (BE)

(72) Inventors: Xavier Carnoy, Thimister-Clermont (BE); Frank Bekaert, Ramillies (BE); Robert Hick, Chenee (BE); Joel Glady, Louvain-la-Neuve (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 322 days.

(21) Appl. No.: 16/650,455

(22) PCT Filed: Sep. 25, 2018

(86) PCT No.: PCT/EP2018/076000
§ 371 (c)(1),
(2) Date: Mar. 25, 2020

(87) PCT Pub. No.: WO2019/063563
PCT Pub. Date: Apr. 4, 2019

(65) Prior Publication Data
US 2020/0307363 A1   Oct. 1, 2020

(30) Foreign Application Priority Data

Sep. 28, 2017   (EP) .................................. EP17193854

(51) Int. Cl.
*B60J 10/36* (2016.01)
*B60R 13/04* (2006.01)

(52) U.S. Cl.
CPC ............... *B60J 10/36* (2016.02); *B60R 13/04* (2013.01)

(58) Field of Classification Search
CPC ................................. B60J 10/30; B60J 10/265
See application file for complete search history.

(56) References Cited

U.S. PATENT DOCUMENTS

| 4,950,019 A | 8/1990 | Gross |
| 5,740,640 A * | 4/1998 | Yasuda .................. B60J 10/265
52/204.597 |

(Continued)

FOREIGN PATENT DOCUMENTS

| DE | 34 13 003 A1 | 10/1985 |
| EP | 0 117 816 A2 | 9/1984 |
| FR | 2 577 483 A1 | 8/1986 |

OTHER PUBLICATIONS

English Machine Translation of FR2577483A1 (Year: 1986).*
International Search Report dated Jan. 14, 2019 in PCT/EP2018/076000 filed Sep. 25, 2018, 2 pages.

*Primary Examiner* — Andrew J Coughlin
(74) *Attorney, Agent, or Firm* — Oblon, McClelland, Maier & Neustadt, L.L.P.

(57) ABSTRACT

The invention relates to an element (100) for fastening trim (1) to a peripheral seal (10) of a window (11) of a vehicle, comprising at least one assembly of the clip type formed by a base (6) bearing, on the face intended to receive the trim, one or more semi-rigid clips (7), said clips comprising at least two arms between which a lug element (4) of the trim is introduced, characterized in that the fastening element (100) is formed of one piece enclosed in the peripheral seal during the moulding thereof to the window.

4 Claims, 1 Drawing Sheet

(56) References Cited

U.S. PATENT DOCUMENTS

| | | | | |
|---|---|---|---|---|
| 6,070,363 A * | 6/2000 | Vance | ................... | B60J 10/75 49/377 |
| 2012/0237724 A1* | 9/2012 | Verrat | ................... | B29C 66/41 428/138 |
| 2013/0031842 A1* | 2/2013 | Murree | ................... | B60J 10/30 49/492.1 |

* cited by examiner

FASTENING OF TRIM TO A WINDOW SEAL

The invention relates to the fastening of a trim on a seal arranged at the periphery of a window mounted on the bodywork of a vehicle.

Fixed windows mounted in openings in bodywork very frequently comprise a seal arranged at their periphery that provides tightness and prevents glass/metal contact. Bonding of the window in the opening is also effected by means of the seal.

Constructors often mask these unattractive seals behind metallic trims or trims made from synthetic material coated with a metallic film. These trims have to be fastened sufficiently robustly such that there is no risk of their detaching accidentally. It must also be possible for them to be detached, for example at the time of work or during replacement of the trim in the event of a defect in the latter, thereby not requiring replacement of the full window/paint provided on the vehicle.

Various methods have been proposed for fastening these trims, these methods often involving a link between the seal and the trim. Usually, these fastenings are achieved by means of clip-type means so that installation is simple and quick. In these assembling operations, the trim, which essentially comprises a metallic profile, is fastened to a component incorporated into the seal itself. The positioning of the various elements often requires one or more operations that can be effected only manually, which is unsatisfactory from the economic standpoint. With a view to simplifying these operations, solutions have recourse to fastening methods comprising the clipping of the profile constituting the trim to a corresponding element integrated in the peripheral seal when the latter is formed on the window. In particular, Belgian patent application BE 2013/0441 has proposed a trim fastening comprising two distinct elements, the first element being a base molded directly with the seal and the second comprising clips designed to receive the lug of the trim. The second element, meanwhile, is assembled on the base by engagement of the two elements one relative to the other in a movement that opposes the separation of the two elements. This solution offers the advantage of it being possible to replace the second element if it is defective. However, this solution leads to the formation of shrinkage cavities in the region of the seal when the fastening element is positioned.

Thus, in response to this problem of shrinkage cavities and space occupied, the invention proposes an element (100) for fastening a trim (1) to a peripheral seal (10) of a window (11) of a vehicle, comprising at least one clip-type assembly constituted by a base (6) bearing, on the face designed to receive the trim, one or more semi-rigid clips (7), said clips comprising at least two arms between which a lug element (4) of the trim is inserted.

According to the invention, the fastening element (100) is formed as a single component, comprising the base (6) and one or more semi-rigid clips (7), which is integrated with the peripheral seal during molding of the latter on the window.

According to the invention, the one or more semi-rigid clips (7) of the fastening element constitute that part of the fastening element in which the trim will be clipped. The trim is added after the seal is formed.

The seals, which comprise the elements involved in this fastening, are formed directly on the window by molding. The operation is denoted "encapsulation". Direct molding of the seals and also of the fastening element of the trim on the window offers the advantage of a simplified procedure for mounting the fastening element and also the trim, but above all the advantage of reducing the space occupied by this fastening element whilst at the same time lessening the phenomenon of shrinkage cavities.

According to the invention, the arms of the clips provide the mechanical link with the trim. Positioning of the trim by insertion of the lug between the arms of the one or more clips complete the operation, preventing the movement that would allow separation of the two elements.

In the following text, that part of the fastening element that is incorporated into the seal is denoted "base" and that part that comprises the arms of the clips "the clips". These two elements according to the invention form a single component that is moulded directly on the window on the peripheral seal.

The invention is described in detail with reference to the figures, in which.

Figure 1:
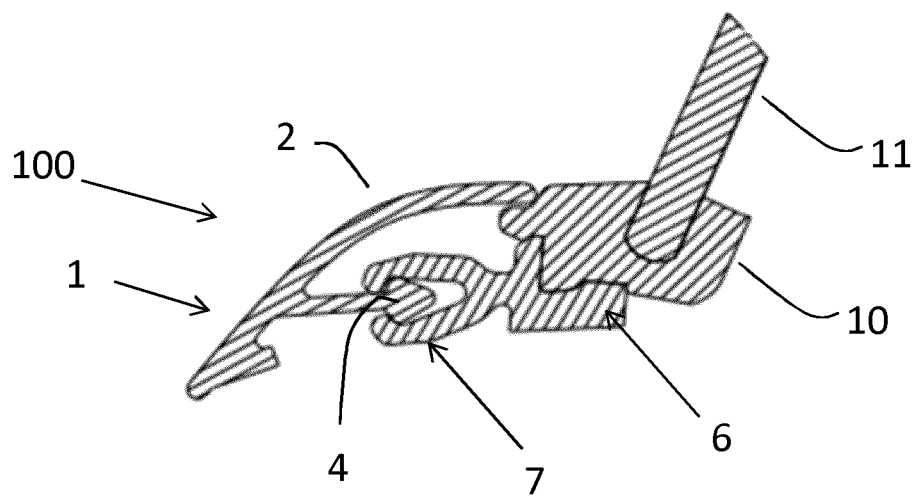
FIG. 1 shows, in section, the method of fastening by clipping according to the invention.

FIG. 1 shows, in section and schematically, the method of assembly by clipping. In this representation, the trim 1 has an exterior surface 2 designed to mask the encapsulation seal 10 of the window 11. On its face that is turned toward the seal, the trim comprises a lug 4. The fastening element is, in this example, made from plastics of ABS-PC type, produced using an injection-molding process. The material used must have sufficient flexibility to allow the clipping function and also adhesion with the plastics, preferably of encapsulation PVC or TPE type.

The fastening element comprises a base 6 held in the seal at the time of the moulding of the latter. The fastening element also comprises a clip 7 designed to receive the lug 4 of the trim 1 in a semi-rigid manner. The clip 7 is integrated in the base 6 and thus constitutes a single component comprising the base 6 and the clip 7.

Figure 2:
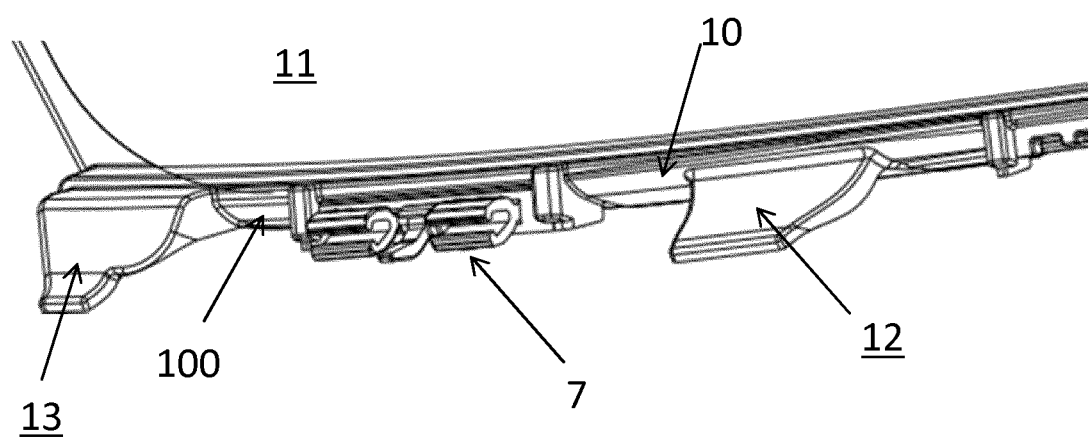
FIG. 2 shows, in perspective, the window with the clipping element incorporated into the encapsulation seal.

FIG. 2 shows an arrangement of the method for fastening the edge of the window 11 in the seal 10 in the case of this method of assembly by encapsulation. The trim (not shown) is positioned after the assembly operation in question.

The fastening element, as shown in FIG. 2, is held in the seal 10 during the moulding thereof on the window. Only the upper face of the base 6 comprising the clips 7 emerges outside the seal 10, and the remainder is held in the seal. The clips 7 lie outside the seal 10.

The seal 10 in FIG. 2 has a wedge component 12, on which the edge of the trim rests in order to prevent contact with the bodywork of the vehicle, and an end stop 13 lying at the end in the length of the trim. The wedge component 12 and the stop 13 are produced with the principal body of the seal by molding.

As shown in FIG. 2, the base 6 is constituted by a body of elongate form and of such dimensions that allow incorporation into the seal during molding. Thus, insertion into the seal is achieved easily and repeatably in the encapsulation mold. The clips 7 lie on the face of the base 6 not held in the seal.

The windows in question are often of slightly curved form, and it is possible for the bases 6 not to be positioned in the seal 10 rigorously in line with the part of the lug that faces them. The presence of two clips 7 makes it possible to compensate for certain positioning discrepancies. The log 4, which has a form that globally complements the space existing between the two arms of the clips 7, advantageously does not necessarily fill said space completely. The space in question is preferably slightly greater in volume than the end of the lug 4. To prevent this clearance being detrimental to the holding of the trim in position, a guide finger, which principally makes it possible to guide the lug 4 of the trim toward the clips, is provided. This guide finger may be arranged between the two clips 7. This wedge component advances slightly relative to the bottom of the space between the clips such that the tip of the lug rests on the bottom of this wedge component, holding the hips of the lug 4 against the arms of the clips 7, utilizing the relative elasticity of these clips.

The invention claimed is:

1. An element for fastening a trim to a peripheral seal of a window of a vehicle, comprising at least one clip-type assembly constituted by a base bearing, on a face designed to receive the trim, at least two semi-rigid clips, the at least two semi-rigid clips comprising at least two arms between which a lug element of the trim is inserted, wherein the fastening element is constituted as a single component, comprising the base and the at least two semi-rigid clips, which is integrated with the peripheral seal during molding of the latter on the window, and wherein the peripheral seal includes a wedge component on which an edge of the trim can rest, a principal body of the peripheral seal being formed with the wedge component by molding.

2. The fastening element according to claim 1, wherein the base and the at least two semi-rigid clips are composed of a same material.

3. The fastening element according to claim 1, wherein the fastening element is fastened to the peripheral seal of the window by encapsulation.

4. The fastening element according to claim 1, wherein the at least two arms of the semi-rigid clips comprise polycarbonate/acrylonitrile/butadiene styrene (PC-ABS).

* * * * *